United States Patent [19]

Ishiguro

[11] 3,849,595

[45] Nov. 19, 1974

[54] FACSIMILE SIGNAL TRANSMISSION SYSTEM

[75] Inventor: Tatsuo Ishiguro, Tokyo, Japan

[73] Assignee: Nippon Electric Company, Limited, Tokyo, Japan

[22] Filed: Sept. 27, 1973

[21] Appl. No.: 401,300

[30] Foreign Application Priority Data

Sept. 28, 1972 Japan .............................. 47-97352

[52] U.S. Cl. .................. 178/6, 178/DIG. 3, 178/68, 179/15 BC, 179/15 BW, 325/30, 340/347 DD, 360/40

[51] Int. Cl. ............................................ H04n 7/12

[58] Field of Search ............ 178/DIG. 3, 67, 68, 88, 178/6; 179/15 BC, 15 BM; 325/30, 163, 320; 340/347 DD; 360/40

[56] References Cited

UNITED STATES PATENTS

| | | | |
|---|---|---|---|
| 3,619,501 | 11/1971 | Nussbaumer | 178/67 |
| 3,619,503 | 11/1971 | Ragsdale | 178/67 |
| 3,636,260 | 1/1972 | Choquet | 179/15 BC |
| 3,706,945 | 12/1972 | Yanagidaira | 178/67 |
| 3,806,807 | 4/1974 | Nakamura | 325/42 |

*Primary Examiner*—Howard W. Britton
*Attorney, Agent, or Firm*—Sughrue, Rothwell, Mion, Zinn & Macpeak

[57] ABSTRACT

A facsimile transmission system is disclosed which uses both amplitude and phase modulation. The amplitude and phase of the transmitted signal are selected in correspondence with the binary values of an input facsimile signal. This is accomplished by first converting the input binary facsimile signal to a binary code indicating state numbers periodically assigned to the two alternate levels of the input facsimile signal. This binary code is then used to develop two other binary codes which in turn are used to generate two kinds of amplitude-indicating signals. These amplitude-indicating signals are quadrature-amplitude-modulated for transmission. At the receiving end, the signal is quadrature-amplitude-demodulated to generate the two kinds of amplitude-indicating signals which are converted to two binary codes. These binary codes are decoded to produce the original facsimile signal.

4 Claims, 16 Drawing Figures

| STATE NO. | $X_1$ | $X_2$ | $X_3$ | 0° COMP. | 90° COMP. | p | | q | |
|---|---|---|---|---|---|---|---|---|---|
| 0 | 0 | 0 | 0 | 0 | 0 | 0 | 0 | 0 | 0 |
| 1 | 0 | 0 | 1 | +1 | 0 | 0 | 1 | 0 | 0 |
| 2 | 0 | 1 | 0 | +1 | +1 | 0 | 1 | 0 | 1 |
| 3 | 0 | 1 | 1 | 0 | +1 | 0 | 0 | 0 | 1 |
| 4 | 1 | 0 | 0 | 0 | 0 | 0 | 0 | 0 | 0 |
| 5 | 1 | 0 | 1 | −1 | 0 | 1 | 1 | 0 | 0 |
| 6 | 1 | 1 | 0 | −1 | −1 | 1 | 1 | 1 | 1 |
| 7 | 1 | 1 | 1 | 0 | −1 | 0 | 0 | 1 | 1 |

| STATE NO | $X_1$ | $X_2$ | $X_3$ | 0° COMP. | 90° COMP. | p | | q | |
|---|---|---|---|---|---|---|---|---|---|
| 0 | 0 | 0 | 0 | 0 | 0 | 0 | 0 | 0 | 0 |
| 1 | 0 | 0 | 1 | +1 | 0 | 0 | 1 | 0 | 0 |
| 2 | 0 | 1 | 0 | +1 | +1 | 0 | 1 | 0 | 1 |
| 3 | 0 | 1 | 1 | 0 | +1 | 0 | 0 | 0 | 1 |
| 4 | 1 | 0 | 0 | 0 | 0 | 0 | 0 | 0 | 0 |
| 5 | 1 | 0 | 1 | −1 | 0 | 1 | 1 | 0 | 0 |
| 6 | 1 | 1 | 0 | −1 | −1 | 1 | 1 | 1 | 1 |
| 7 | 1 | 1 | 1 | 0 | −1 | 0 | 0 | 1 | 1 |
FIG. 3(a)
| p' | | q' | | STATE NO. | y |
|---|---|---|---|---|---|
| | | 0 | 0 | 4 or 0 | 1 |
| 0 | 0 | 0 | 1 | 3 | 0 |
| | | 1 | 1 | 7 | 0 |
| | | 0 | 0 | 1 | 0 |
| 0 | 1 | 0 | 1 | 2 | 1 |
| | | 1 | 1 | — | 1 |
| | | 0 | 0 | 5 | 0 |
| 1 | 1 | 0 | 1 | — | 1 |
| | | 1 | 1 | 6 | 1 |
FIG. 3(b)
FIG. 4
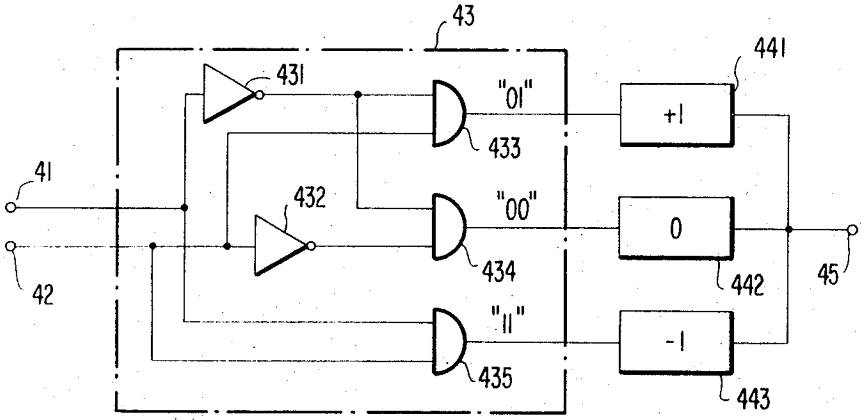
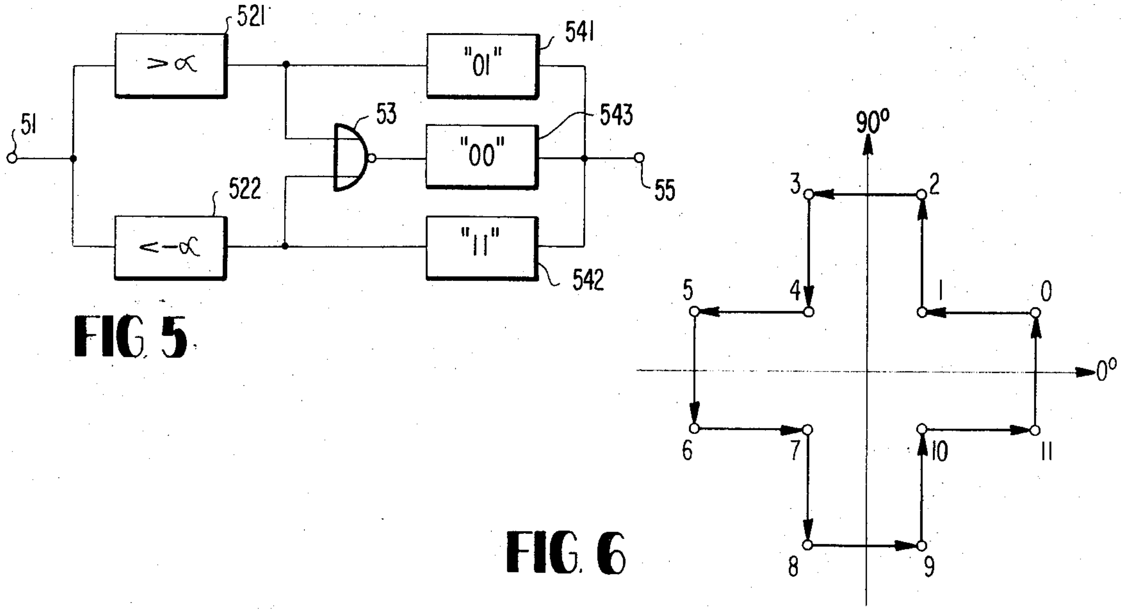
FIG. 5, FIG. 6

FACSIMILE SIGNAL TRANSMISSION SYSTEM

BACKGROUND OF THE INVENTION

1. Field of the Invention

This invention relates to an improvement in facsimile signal transmission systems.

2. Description of the Prior Art

It usually takes 5 to 6 minutes for a conventional facsimile system to transmit with a resolution of 4 lines/mm a document of A4-size (Japanese Industrial Standard: 297 mm × 210 mm), over a telephone line. Such a long time needed for transmission makes the transmission more costly for long-distance transmissions, impairing the practicability of the facsimile transmission systems. A variety of proposals have been made to increase the transmission speed. They are classified into the following two types. In the first group of systems, coding is done with the redundancy of a signal source removed, as exemplified by the run-length coding system. The second group resorts to the vestigial side-band modulation, or improvements in the wave form transmission technique as exemplified by the multi-level transmission system. The former achieves a large bandwidth compression, but it has the disadvantage that coding and decoding devices are complicated in construction and expensive to manufacture. Although the latter is less complicated in the transmitting apparatus, its compression effect is not sufficiently great. For details, reference is made to U.S. Patent 3,651,251.

SUMMARY OF THE INVENTION

An object of this invention is to improve facsimile systems of the latter group, and particularly a facsimile signal transmitting system adopted to shorten the transmission time by applying a new modulation technique suitable for the nature of facsimile signals.

The facsimile transmission system according to the invention uses amplitude and phase modulation, in which the amplitude and phase are selected in correspondence with the binary values of input signals so as to minimize the width of the frequency spectrum of the output signal, whereby an effective bandwidth compression is accomplished by a comparatively simple construction.

BRIEF DESCRIPTION OF THE DRAWINGS

Description will now be made of this invention referring to the accompanying drawings, wherein:

FIGS. 1(a) through 1(i) show wave forms of signals and vector diagrams of the amplitude and phase of modulated signals for explaining the principle of this invention;

FIGS. 3(a) and 3(b) show truth tables illustrating the inputoutput relations of a coding logic circuit and a decoding logic circuit;

FIG. 4 is a logic diagram of a digital-to-analog convertor which may be used in the transmitting apparatus shown in FIG. 2(a);

FIG. 5 is a logic diagram of an analog-to-digital convertor which may be used in the receiving apparatus shown in FIG. 2(b); and FIG. 6 shows a vector diagram representing a second example of the amplitude and phase modulation according to this invention.

DESCRIPTION OF THE PREFERRED EMBODIMENTS

Figures 1, 2A, 2B:
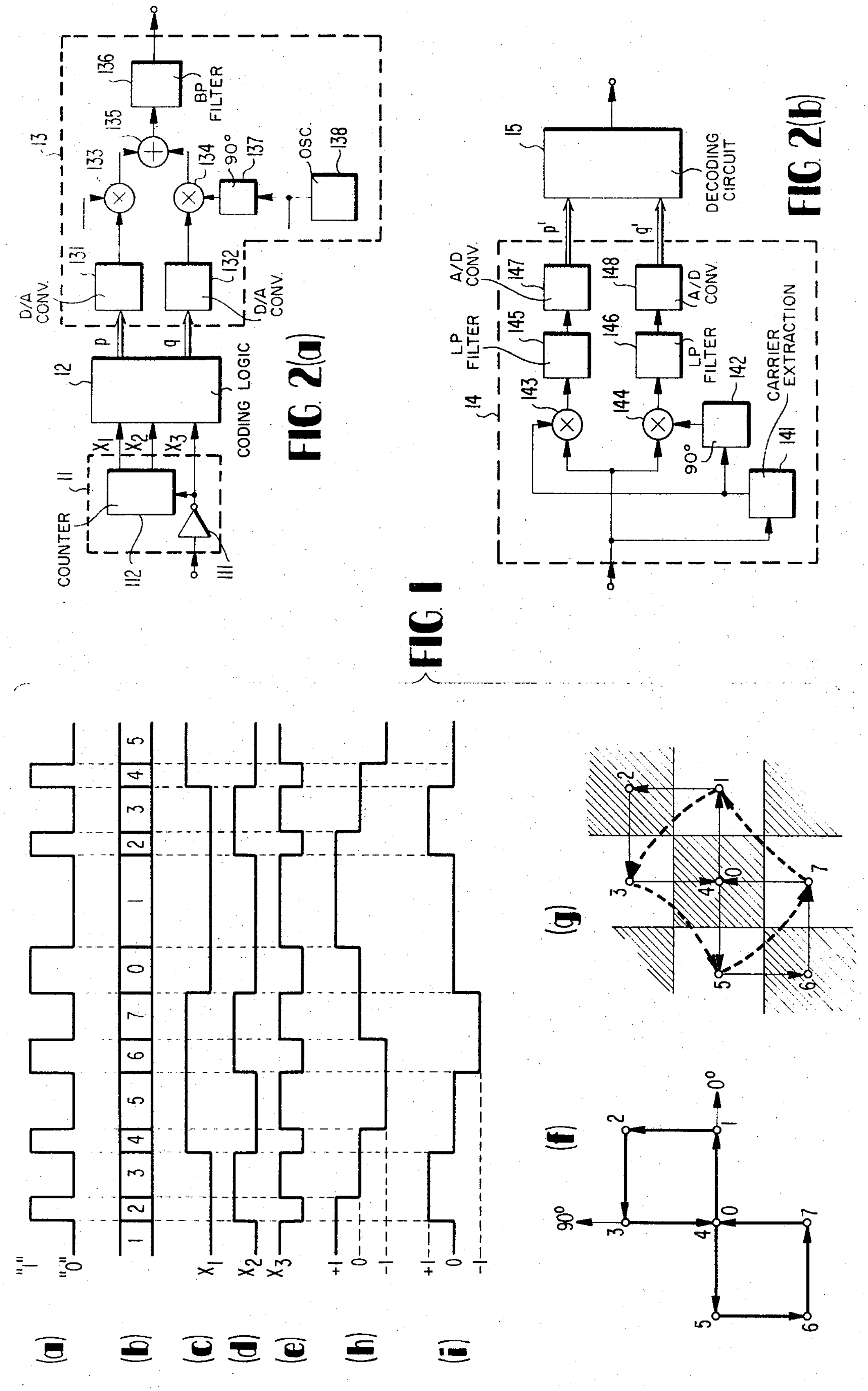
FIGS. 2(a) and 2(b) show block diagrams of embodiments of transmitting and receiving apparatuses of this invention.

FIG. 1(a) shows an example of an input facsimile signal with "1" and "0" levels corresponding to the black and white portions of a document, respectively. As shown in FIG. 1(b), state-denoting numbers 0, 1, 2, . . . 7 are sequentially and periodically assigned to the levels "1" and "0" arising alternately. As regards these numbers, the condition is such that odd numbers are caused to correspond to the level "0" while even numbers to the level "1." Alternatively, odd numbers may correspond to "1" and even numbers to "0". In correspondence with the state-denoting numbers (0, 1, . . . 7), the amplitudes and phases of modulated waves are set as in FIG. 1(f), where they are vectorially represented by polar coordinates. Points 0 and 4 lie on the origin, and have an amplitude of zero. Point 1 has an amplitude of 1 and a phase angle 0°, while point 3 has the amplitude of 1 and a phase angle 90°. With the lapse of time, the vectors of the modulated waves follow the pattern 1 → 2 → 3 → 4 → 5 → 6 → 7 → 0 → 1. Although the points 0 and 4 have the same zero amplitude, their phases are assumed to be 135° and 315°, respectively. Then, it will be seen that this system is equivalent to the amplitude and phase modulation in which, as the vector is rotating by every 45°, it changes its amplitude in the sequence of 1, $\sqrt{2}$, 1, 0, 1, $\sqrt{2}$, 1 and 0. The amplitudes of the 0° and 90° components of the vectors as shown in FIG. 1(f) are separately shown in FIGS. (h) and (i) respectively, each being a three-level signal with "+1" "0" and "−1" levels. The pulse width of the input signal as shown in FIG. 1(a) corresponds to the difference between the level-changing time of the two components (FIGS. (h) and (i)). Therefore, the reproduction possibility of a single isolated pulse with a narrow width is not limited by the transmission frequency bandwidth. In the case where signals with narrow widths and the amplitude "1" (the pulses corresponding to fine black lines in a document) pass through a transmission line of limited frequency bandwidth, the vector shifts from the point 1 to the point 3 or from the point 3 to the point 5 without going via the point 2 or the point 4 as illustrated by dotted lines in FIG. 1(g). If, however, the amplitude and phase are discriminated in accordance with hatched regions in FIG. 1(g), the pulses of small widths can be reproduced without disappearing.

It is apparent from FIGS. 1(h) and (i) that the frequency spectrum of the modulated wave is governed by the sum of the durations of the two states or those of the pulses "1" and the succeeding "0." In general, the width of a black line of a facsimile signal is considerably shorter than the width of a white part. In prior-art transmission systems, the width of the black line determines the limit of the transmission speed. In contrast, in the system of the present invention, the rate of the set (black + white) governs the signal spectrum, and hence, the bandwidth can be greatly compressed. The invention is effective when applied to typewritten English letters, numerals, comparatively large characters written by hand, etc. in which the generating rate of black lines is relatively low.

A specific embodiment of this invention will now be explained by way of illustration. FIG. 2(a) indicates a transmitting apparatus and FIG. 2(b) a receiving apparatus. The input signal to the transmitting apparatus is a binary signal with the levels "1" or "0." A state counter circuit 11 generates from the binary input signal, a binary code of three bits $x_1$, $x_2$ and $x_3$ representative of one of the eight state numbers as given in FIG. 1(b) The code of three bits is obtained in such a way that the input signal is inverted by a NOT circuit 111, and is counted by a two-stage binary counter 112 to thus produce a code of two bits, and that the output of the NOT circuit 111 is taken as the contents of the lowest bit $x_3$, while the outputs of the binary counter 112 are taken for the first and second bits $x_1$ and $x_2$. The wave forms of the binary codes $x_1$, $x_2$ and $x_3$ for the input signal in FIG. 1(a) are shown in FIGS. 1(c) through 1(e) respectively. A coding logic circuit 12 receives the binary code $x_1$, $x_2$, $x_3$ as its input, and provides two kinds of binary codes $p$ and $q$ as its output, each of which is a parallel two bit code. A truth table representing the input - output relations of the coding logic circuit 12 is shown in FIG. 3(a). The first column of FIG. 3(a) denotes the state numbers as shown in FIG. 1(b); the second column, the binary code of three bits $x_1$, $x_2$, and $x_3$ obtained by the foregoing process; the third and fourth columns, the amplitudes of the 0° and 90° components, respectively, of the modulated wave as shown in FIG. 1(f); and the fifth and sixth columns, the binary codes $p$ and $q$ which are intermediate codes for obtaining the above 0° and 90° components and assume parallel two bit codes "00", "01" and "11" corresponding to the amplitude "0" "+1" and "−1," respectively, of the 0° and 90° components of the modulated wave.

A modulating circuit 13 performs the amplitude and phase modulation according to the binary codes $p$ and $q$. Digital-to-analog converters 131 and 132 have the same function, and generate voltages of amplitudes 0, +1 and −1 for codes (0 0), (0 1) and (1 1) of the two-bit binary codes $p$ and $q$, respectively. The outputs of the digital-to-analog converters 131 and 132 are respectively fed into multipliers 133 and 134, and are respectively multiplied (or amplitude modulated) by a carrier generated by means of a carrier oscillator 138 and by the carrier after having its phase delayed by 90° by means of a 90°-phase-shift circuit 137. The outputs of the multipliers 133 and 134 are added together by an adder 135, with the result that the amplitude-phase modulated wave as illustrated in FIG. 1(f) is synthesized. The output of the adder 135 is band-limited by a band-pass filter 136, and is thereafter transmitted via a transmission line to the receiving apparatus.

In the receiving apparatus, a received modulated signal is demodulated by a demodulating circuit 14, to produce binary codes $p'$ and $q'$ corresponding to the binary codes $p$ and $q$ on the transmitting side, and a demodulated binary signal is produced from the codes $p'$ and $q'$ by a decoding logic circuit 15. More particularly, the modulated signal is supplied to a carrier extraction circuit 141, which generates a local carrier being the same in frequency and phase as the carrier on the transmitting side. The local carrier is fed to a multiplier 143, and is also fed through a 90°-phase-shift circuit 142 to a multiplier 144. The multipliers 143 and 144 take the products between the fed local carriers and the received modulated signal to demodulate the received modulated signal. Higher harmonic components contained in the outputs of the multipliers 143 and 144 are removed respectively by low-pass filters 145 and 146, thereby to obtain base band signals.

The foregoing modulation and demodulation process is identical to the operation of the conventional quadrature synchronous detection. The output amplitudes of the low-pass filters 145 and 146 are respectively converted into the binary codes $p'$ and $q'$ by analog-to-digital converters 147 and 148. The analog-to-digital converters 147 and 148 have the function of discriminating the amplitude of the input signal into three states; one above a predetermined amplitude $\alpha$ ($\alpha>0$), one below $-\alpha$ and one between $\alpha$ and $-\alpha$, thereby to provide codes (0 1), (1 1) and (0 0) respectively. The decoding logic circuit 15 generates a decoded signal $y$ corresponding to the binary input codes $p'$ and $q'$ according to the truth table in FIG. 3(b). The first and second columns denote the demodulated binary codes $p'$ and $q'$; the third column, the state numbers corresponding to those in FIG. 3(a); and the fourth column, the decoded output signal $y$ which assumes level "1" when the state number is even, and level "0" when it is odd. The decisions are equivalent to the decoding in which the case where the amplitude and phase of the received modulated signal are located in the hatched region in FIG. 1(g) is decided to be "1" (black), while the case where they lie in the other region is decided to be "0" (white).

The constituent elements 13 and 14 can be realized by conventional quadrature amplitude modulating and demodulating circuits. The system of the carrier extraction may be any of various existing ones, and is not subject to any special restriction. For example, Costa's method for the carrier extraction is detailed in a book entitled "Principle of Data Communication" by R. W. Lucky, et al (McGraw Hill Book Co., particularly pp. 183–186). On the other hand, a carrier pilot signal may be incorporated on the transmitting side (see the above book). The constructions of the logic circuits 12 and 15 for the coding and decoding given by the truth tables in FIGS. 3(a) and 3(b) can be readily designed by combinations among AND, NAND, OR and NOR circuits or by using a well known read only memory (ROM), such as 8 × 4 bit ROM of 3 bit address indication and 16 × 1 bit ROM of 4 bit address indication.

FIG. 4 illustrates a circuit diagram, as an example, of the digital-analog converter 131 (or 132) in FIG. 2(a). The two bit parallel binary code $p$ (or $q$) is applied to input terminals 41 and 42 of a logic circuit 43 which includes NOT circuits 431 and 432 and AND circuits 433, 434 and 435. The AND circuit 433 delivers its output when the input binary code $p$ (or $q$) is "01." Similarly, the AND circuits 434 and 435 deliver these outputs when the code $p$ is "00" and "11," respectively. The outputs of the AND circuits 433, 434 and 435 are applied to the input of voltage signal generators 441, 442 and 443, respectively, which generate, at an output terminal 45, the output voltage signals "+1," "0" and "−1," respectively.

FIG. 5 illustrates a circuit diagram, as an example, of the analog-digital converter 147 (or 148) in FIG. 2(b). The output of the low-pass filter 145 (or 146) as shown in FIG. 2(b) is applied via an input terminal 51 to inputs of amplitude comparators 521 and 522. The comparator 521 delivers its output when its input analog signal is greater than the predetermined amplitude $\alpha$.

The comparator 522 delivers its output when its input analog signal is smaller than $-\alpha$. A NOR circuit 53 coupled to the comparators 521 and 522 generates its output when the input analog signal is between $\alpha$ and $-\alpha$. The outputs of the comparators 521 and 522 and of the NOR circuit 53 are applied to inputs of code generators 541, 542 and 543, respectively, which generates codes "01," "11" and "00," respectively, as the two bit parallel binary code $p$ (or $q$).

FIG. 6 illustrates another form of amplitude and phase modulation which may be used in the practice of the invention. In this case, the state numbers are of a period including the twelve numbers of 0, 1, 2, . . . 11. The amplitude and phase modulation as shown in FIG. 6 can be realized by a construction similar to that of the embodiment shown in FIG. 2. The construction may be such that the binary code $x_1$, $x_2$, $x_3$ in FIG. 2 is replaced by four-bit codes $x_1$, $x_2$, $x_3$, $x_4$, that the coding logic circuit 12 produces two-bit codes $p$ and $q$ representative of four states, and that the digital-to-analog converters 131 and 132 generate four levels, for example, $\pm 3$ and $\pm 1$ in correspondence with the codes $p$ and $q$. In the demodulating circuit, the amplitude discriminating levels of the analog-to-digital converters 147 and 148 are changed to thus provide two-bit codes $p'$ and $q'$ representative of the four states, and the codes $p'$ and $q'$ are converted into binary signals by the decoding logic circuit. Truth tables as shown in FIG. 3, representing the functions of the coding and decoding logic circuits can be readily obtained.

The maximum pulse transmission rate in the case of the double side-band transmission by means of a telephone line is approximately 1,600 pulses/sec (minimum pulse width: approx. 600 $\mu$ sec). Assuming that the transmission speed can be increased to 1.5 times that in the above case by using the conventional three level transmission technique, pulses of approximately 400 microsecond pulse width can be transmitted. Also, in the case of the vestigial side-band transmission, the maximum transmission speed is approximately 3,000 pulses/sec (minimum pulse width: approx. 300 microseconds), and a pulse width of approximately 200 microseconds can be transmitted by adopting the three level transmission technique.

On the other hand, according to this invention, the maximum transmission speed of each of the 0° and 90° components is approximately 1,600 pulses/sec. This means that the black and the succeeding white informations can be transmitted 1,600 times/sec. Assuming that the pulse width of the black information is on an average one-fourth that of the white information, minimum pulse width of the black information can be reduced to approximately 120 microseconds, which is one-half or one-third that of the conventional transmission systems.

What is claimed is:

1. A facsimile signal transmission system comprising:

a transmitting apparatus including:

means for converting an input binary facsimile signal to a first binary code signal indicating state numbers succeedingly and periodically assigned to the alternatively generated two levels of said input binary facsimile signal;

odd state numbers being assigned to one of the levels of said facsimile signal and even state numbers to another of the levels of said facsimile signal;

means for generating from said first binary code signal a second binary code signal changing from one to another codes every time said state numbers change from an odd number to an even number;

means for generating from said first binary code signal a third binary code signal changing from one to another codes every time said state numbers change from an even number to an odd number;

means responsive to said second and third binary code signals for generating two kinds of amplitude-indicating signals, each indicating at least three kinds of amplitudes; and means for quadrature-amplitude-modulating quadrature carriers with said two kinds of amplitude-indicating signals thereby to transmit the quadrature-amplitude-modulated signal via a transmission line to a receiving apparatus; and said receiving apparatus including:

means for quadrature-amplitude-demodulating the received quadrature-amplitude-modulated signal thereby to generate two kinds of amplitude-indicating signals;

means for converting the last-mentioned two kinds of amplitude-indicating signals to two kinds of binary code signals corresponding to said second and third binary code signals; and means responsive to the last-mentioned two kinds of binary code signals for regenerating said input binary facsimile signal.

2. A facsimile signal transmission system as recited in claim 1 wherein said means in said transmitting apparatus for converting an input binary facsimile signal comprises binary counting means for receiving said binary facsimile signal and providing said first binary code signal as a parallel output.

3. A facsimile signal transmission system as recited in claim 2 wherein said two means in said transmitting apparatus responsive to said second and third binary code signals are first and second digital-to-analog convertors.

4. A facsimile signal transmission system as recited in claim 3 wherein said means in said receiving apparatus for converting two kinds of amplitude-indicating signals to two kinds of binary code signals are first and second digital-to-analog convertors.

* * * * *